United States Patent Office 3,457,028
Patented July 22, 1969

3,457,028
MODIFYING KERATINIC FIBERS WITH SOLUTIONS CONTAINING UNSATURATED MONOMERS AND REDOX CATALYSTS WHILE MAINTAINING A SHEAR FORCE ON SAID SOLUTIONS
Hans H. Kuhn and Greville Machell, Spartanburg, S.C., assignors to Deering Milliken Research Corporation, Spartanburg, S.C., a corporation of Delaware
No Drawing. Filed Dec. 6, 1962, Ser. No. 242,611
The portion of the term of the patent subsequent to Dec. 13, 1983, has been disclaimed
Int. Cl. D06m 7/02, 15/08
U.S. Cl. 8—127.6         10 Claims This invention relates to an improved process for reacting keratin fibers with compounds containing the group

that is, ethylenically unsaturated compounds.

Reactions between keratin fibers and ethylenically unsaturated compounds are conventionally conducted in the presence of a catalyst for the polymerization of the compounds. A most common catalyst system is the redox catalyst system composed of a reducing agent and an oxidizing agent. Since the compounds normally homopolymerize in the presence of this catalyst, at least one of the components of the catalyst system is applied separately from the monomer and the other catalyst component. This procedure is utilized to avoid the deposition of a homopolymeric material onto the fibers. The homopolymeric coating tends to give the fiber being treated a stiffer, more boardy handle than when the reacted compound is within the fiber and reacted therewith. Since the various components heretofore had to be added to the fiber separately, prior procedures have been unduly lengthy and are subject to severe control problems, in that difficulty is experienced in controlling the ratio between the various components when they are applied separately.

These operational difficulties and associated difficulties in aesthetic properties have been overcome in accordance with this invention by adding all ethylenically unsaturated compounds and catalyst components simultaneously. The ethylenically unsaturated compounds and all catalyst components may be added to the fiber simultaneously, provided the reactivity rate of the ethylenically unsaturated compound in the catalyst system is lower than the reactivity rate of the ethylenically unsaturated compound with the keratin fiber. This reactivity rate may be controlled by adding well-known polymerization inhibitors to the system containing the ethylenically unsaturated compound and all catalyst components, but most preferably the reaction rate is controlled simply by maintaining the system in a state of continuous agitation during the period of time that sufficient catalyst is present for the homopolymerization of the ethylenically unsaturated compounds in the system.

Upon contacting the keratin fibers with the system in a continuously agitated state, the compound is absorbed into the fiber and assumes a higher reactivity level in the fiber. Under these conditions a preferential reaction is effected between the fiber and the ethylenically unsaturated compound, i.e., a reaction takes place between the ethylenically unsaturated compound and the keratin fiber in preference to a reaction between the ethylenically unsaturated compound and itself to form a homopolymer.

The reactivity rate of the ethylenically unsaturated compounds with keratin fibers may be increased by heating the system. The system need be heated to no more than between about 40° and 60° C. Temperatures in excess of 100° C. being less preferred in that some of the components of the preferred redox catalyst system degrade at these higher temperatures. The heating procedure, however, also increases the homopolymerization rate of the ethylenically unsaturated compound to a potentially rapid state. If the continuous agitation or inhibitor is discontinued or removed while the system is in this state, homopolymerization may occur at a rapid rate. Consequently, the state of constant agitation is preferably continued until after the catalyst components have been substantially exhausted into the fiber.

In general, such conditions as concentration of the components in the system, the pH of the system, and the time and temperature of the reaction may be modified to suit the individual circumstances and equipment utilized.

By "continuous agitation" is meant that the system containing the ethylenically unsaturated compound and all catalyst components is continuously moved, such as by stirring, pumping, vibrating, e.g., as by sonic vibrators, and other such techniques. This condition is most readily obtained by continuously recirculating the system containing the ethylenically unsaturated compound and all catalyst components back and forth unidirectionally through the fiber. A preferred procedure involves forming a package of keratin fibers, as from wool top, mounting the package in a package dye machine and forcing the system continuously back and forth through the fibers under increased flow rate conditions.

In a preferred embodiment of this invention, the single system containing the ethylenically unsaturated compound and all catalyst components is applied to keratin fibers in a substantially free form, such as in the form of wool top, tow, roving, sliver or the like. The process of this invention, however, is entirely suitable for reacting ethylenically unsaturated compounds with keratin fibers in other forms, such as in the forms of yarns and fabrics, knitted, woven or non-woven. This latter form is preferred when cellulosic materials are treated in accordance with this invention.

The single system containing the ethylenically unsaturated compounds and all catalyst components is generally applied to the keratin fibers as a liquid, including solutions, dispersions, emulsions and the like. Where solubilities permit, aqueous solutions are preferred for ease of operation and for economic reasons.

Ethylenically unsaturated compounds can be reacted with keratin fibers through a number of well-known processes, all of which may be utilized to react the compounds with keratin fibers in accordance with this invention. For example, keratin fibers may be reacted with the desired compound in the presence of a catalyst or initiator system for inducing polymerization of the compound. Among such systems there are included azo catalysts, such as azobisisobutyronitrile and hydrazine salts, the acid moiety of the salt being derived from any acid, such as hydrochloric, hydrobromic, sulfuric, sulfurous, phosphoric, benzoic, acetic and the like.

In general, however, it is preferred that the reaction be conducted in the presence of a redox catalyst system, i.e., a catalyst system composed of a reducing agent and an oxidizing agent initiator. Although the catalytic mechanism is not completely understood, it is believed that the interaction of these agents provides free radicals which cause polymerization of the compounds, which preferably are in monomeric or low polymeric form, onto the keratin fibers.

The reducing agent may be an iron compound such as the ferrous salts, including ferrous sulfate, acetate, phosphate, ethylenediamine tetra-acetate and the like; metallic formaldehyde sulfoxylates, such as zinc formaldehyde sulfoxylate; alkali-metal sulfoxylates, such as sodium formaldehyde sulfoxylate; alkali-metal sulfites, such as sodium and potassium bisulfite, sulfite, metabisulfite or hydrosulfite; mercaptan acids, such as thioklycollic acid and its water-soluble salts, such as sodium, potassium or ammonium thioglycollate; mercaptans, such as hydrogen sulfide and sodium or potasium hydrosulfide; alkyl mercaptans, such as butyl or ethyl mercaptans; and mercaptan glycols, such as beta-mercaptoethanol; alkanolamine sulfites, such as monoethanolamine sulfite and mono-isopropanolamine sulfite; manganous and chromous salts; ammonium bisulfite; sodium hydrosulfide; cysteine hydrochloride; sodium thiosulfate; sulfur dioxide; sulfurous acid and the like, as well as mixtures of these reducing agents.

Suitable oxidizing agent initiators for use in the redox catalyst system include inorganic peroxides, e.g., hydrogen peroxide, barium peroxide, magnesium peroxide, etc., and the various organic peroxy catalysts, illustrative examples of which are the dialkyl peroxide, e.g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic peracids, e.g., ammonium persulfate, potassium persulfate, sodium percarbonate, potassium percarbonate, sodium perborate, potassium perborate, sodium perphosphate, potassium perphosphate, etc.

Other examples of organic peroxide initiators that can be employed are the following: tetralin hydroperoxide, tert.-butyl diperphthalate, cumene hydroperoxide, tert.-butyl perbenzoate, 2,4-dichlorobenzoyl peroxide, urea peroxide, caprylyl peroxide, p-chlorobenzoyl peroxide, 2,2-bis(tert.-butyl peroxy) butane, hydroxyheptyl peroxide, diperoxide of benzaldehyde and the like.

The above oxidizing agents, particularly the salts of inorganic peracids, may be utilized alone to initiate the graft polymerization process, although faster reactions at lower temperatures may be conducted when the oxidizing agent initiator is combined with a reducing agent to form a redox catalyst system. Ferric salts can be used as oxidizing agents and form a redox catalyst system with hydrogen peroxide, in which case the peroxide functions as a reducing agent.

The reaction between keratin fibers and ethylenically unsaturated compounds most readily takes place in the presence of water. This generally presents no problem since only small amounts are necessary for this improvement and since the catalyst components and/or monomers are generally applied ot the fibers in an aqueous medium. If the substrate is dry at the time of treatment, the reaction rate will be slower. Consequently, it is preferred that the substrate be wet with water when the reaction takes place. Ionic or non-ionic surface-active agents may be utilized in any aqueous medium used in applying the reagents.

In the presence of the above systems, it is believed that the ethylenically unsaturated compounds react with the keratin fibers in such a manner as to be covalently bonded to the molecule thereof, in that extraction techniques utilizing solvents for the homopolymer for such ethylenically unsaturated compounds fail to remove the reacted compound. That material which, in some instances, can be extracted from fibers treated by these techniques has been designated as homopolymer. It is realized, however, that some homopolymer may well be occluded, or otherwise bound, within the interstice of the keratin fibers and that not all of the polymeric material remaining on the substrate is covalently atached to the fibers, if indeed this is the reason the reacted material cannot be extracted from the fibers. For purposes of this invention, however, since neither the occluded nor the chemically attached polymer may be readily extracted from the keratin fibers, the term "reacted compound" is intended to include both covalently and otherwise bonded reacted compounds, although covalent bonding is preferred.

The above techniques may be utilized to react any ethylenically unsaturated compound with keratin fibers. These compounds include N-dialkyl acrylamides, for example: N,N'-dimethyl, -diethyl, -dipropyl, -dibutyl, -diamyl, -dihexyl, -dioctyl, etc., acrylamides, N-(p-anisyl) methacrylamide, N-(p-chlorophenyl) methacrylamide, N-phenyl methacrylamide, N-ethylmethylmethacrylamide, N-methylmethacrylamide, N-(p-tolyl) methacrylamide and the like; the acrylic, alpha-alkyl acrylic and alpha-haloacrylic esters of unsaturated monohydric alcohols, for instance saturated aliphatic monohydric alcohols, e.g., the methyl, ethyl, propyl, isopropyl, butyl, isobutyl, amyl, etc.; esters of acrylic, methacrylic, ethacrylic, propacrylic, chloroacrylic, bromoacrylic, aconitic, itaconic, maleic, crotonic, fumaric, etc., acids; these latter acids and anhydrides thereof; the phenyl, benzyl, phenylethyl, etc., esters of the aforementioned acids; vinyl aromatic compounds, e.g., styrene; methylstyrenes, such as o-, m-, p-methylstyrene; dimethylstyrenes, such as 2,5-dimethylstyrene; halogenated styrenes, such as m-bromostyrene, p-bromostyrene, p-iodostyrene, pentachlorostyrene, $\alpha,\beta,\beta$-trifluorostyrene, 2,5-bis(trifluoromethyl) styrene, 3-trifluoromethylstyrene, dichlorostyrene and the like; the various cyanostyrenes; the various methoxystyrenes, e.g., p-methoxystyrene; vinyl naphthalenes, e.g., 4-chloro-1-vinylnaphthalene, 6-chloro-2-vinylnaphthalene, etc.; vinyl and vinylidene halides, e.g., vinyl and vinylidene chlorides, bromides, etc.; alkyl vinyl ketones, e.g., methyl vinyl ketone, ethyl vinyl ketone, methyl isopropenyl ketone, etc.; itaconic and maleic diesters containing a single

group, e.g., the dimethyl, diethyl, di-$\beta$-chloroethyl, diethylchloro, dipropyl, diisopropyl, dibutyl and other saturated aliphatic monohydric alcohol diesters of itaconic and maleic acid; diphenyl itaconate and maleate, dibenzyl itaconate and maleate, di-(phenylethyl) itaconate and maleate, etc.; vinyl, allyl and metallyl esters of saturated aliphatic monocarboxylic acids, e.g., vinyl, allyl and metallyl acetates, vinyl, allyl and metallyl propionates, vinyl, allyl and metallyl valerates, etc.; vinyl thiophene; vinyl pyridine; vinyl pyrrole; nitriles containing a single

grouping, e.g., acrylonitrile, methacrylonitrile, etc.

The reaction between keratin fibers and ethylenically unsaturated compounds most readily takes place in the presence of water. This generally presents no problem since only small amounts are necessary for this improvement and since the catalyst components and/or monomers are generally applied to the fibers in an aqueous medium. If the substrate is dry at the time of treatment, the reaction rate will be slower. Consequently, it is preferred that the substrate be wet with water when the reaction takes place. Ionic or non-ionic surface active agents may be utilized in any aqueous medium used in applying the reagents.

Wool fibers may be blended with other keratin fibers, such as mohair, alpaca, cashmere, vicuna, guanaco, camel's hair, silk, llama and the like for treatment in accordance with this invention. Similarly, keratin fibers treated in accordance with this invention may be blended with synthetic or other natural fibers. The preferred synthetic fibers include polyamides, such as poly(hexamethylene)adipamide; polyesters, such as poly(ethyleneterephthalate); and acrylic fibers, such as acrylonitrile homopolymers or copolymers containing at least about 85% combined acrylonitrile, such as acrylonitrile/methylacrylate (85/15) and cellulosics, such as cellulose acetate and viscose rayon. Of the other natural fibers which may blended with the keratin fibers, cotton is preferred. The same techniques may also be utilized in treating these blends or in treating cellulosic materials per se.

In the following examples, except where noted, each wool sample is scoured by immersing in or passing therethrough, an aqueous solution containing 0.5% on the weight of wool of Surfonic N-95, a non-ionic surface-active agent and 1.5% on the weight of wool of glacial acetic acid. After scouring for 20 minutes at 140° F., the sample is rinsed in water at 100° F. for 10 to 15 minutes. De-ionized water is used in preparing all aqueous media.

EXAMPLE I

Into a two-pound Gaston County package dyeing machine are mounted 800 gms. of wool top, 400 gms. being mounted on each of two bobbins which are placed on the single perforated spindle of the dye machine. After scouring and rinsing the wool top, an aqueous solution made up from 7400 ccs. of water containing 1.74 gms. $Fe(NO_3)_3 \cdot 9H_2O$ (0.03% $Fe^{+++}$ based on the wool weight), 12.2 ccs. of a 50% solution of $H_2O_2$ (50/1 molar ratio of peroxide based on $Fe^{+++}$), 40 ccs. of concentrated $H_2SO_4$ and 960 gms. of acrylonitrile is prepared. This solution is added to the package dye machine and recirculated through the machine and wool top by forcing the solution back and forth through the fibers at a flow-rate of about 35 gals. per minute for 15 minutes, while the temperature is held at 75 to 85° F. Recirculation is continued at a cycle of three minutes outside-in and two minutes inside-out.

By "outside-in" is meant that the solution is forced from the outside of the wool package into the perforated spindle, through a recirculating system, back to the outside of the wool package. In the inside-out flow pattern, this procedure is reversed.

The temperature is then increased to 120° F. and the reaction is continued at this temperature for an additional 105 minutes. The wool top is removed from the machine and found to have increased in weight uniformly by 95.5%.

A plain weave fabric produced from the above fibers is characterized by a fine, full handle.

EXAMPLE II

Onto the beam of a 100 lb. capacity Gaston County package dyeing machine are wound 63 lbs. of wool top. The beam is then mounted over the perforated spindle, the machine is closed and the wool is scoured for 30 minutes at 140° F. with 80 gals. of water containing 149 gms. of Synfac-905, a non-ionic wetting agent containing a nonylphenol-ethylene oxide (1 to 9 to 1 to 2 molar ratio) condensation product and 429 gms. of acetic acid. During this scouring operation, as in all succeeding operations in this example, the liquids are forced back and forth through the wool at a cycle of 4 minutes outside-to-inside, 6 minutes inside-to-outside.

After scouring, there is prepared a redox catalyst system composed of 63 gms. of $Fe(NO_3)_3$ and 429 gms. of 50% $H_2O_2$ in 75 gals. of water, adjusted to a pH of 1.35 with 12 lbs. of $H_2SO_4$. A second system containing 57 lbs. butyl acrylate and 19 lbs. styrene is prepared. Both systems are fed simultaneously into the recirculating tubes of the package dye machine, the flow-rate of the system after both systems are added being about 120 gals. per minute. The temperature of the circulating system is increased from 100° F. to 120° F. and the reaction is permitted to continue for 4½ hours, after which the machine is drained and the wool is washed with water at 75° F. for 20 minutes.

As a finishing operation, the wool is then impregnated with 80 gals. of water containing 4% Arquad 16-50, a hexadecyl trimethylammonium chloride lubricant and 1% Synfac-905 for 30 minutes at 125° F. The wool top treated in this manner is found to have increased in weight by 100.6%. A sweater knitted from yarn made from these fibers is characterized by an excellent full, fairly soft hand.

EXAMPLE III

The procedure of Example II is repeated, except that a monomer solution composed of 37.8 lbs. of 2-ethylhexylacrylate, 37.8 lbs. of styrene and 15 lbs. of dibutylmaleate is used and the pickup on the wool top is about 60%.

A plain weave fabric produced from yarns made up from fibers of this example has a soft, pleasant handle.

That which is claimed is:

1. An improved method of reacting keratin fibers with ethylenically unsaturated compounds comprising providing a continuously agitated solution containing at least one ethylenically unsaturated compound and sufficient redox catalyst system containing both components of the redox catalyst for the polymerization of said compound and immersing the keratin fibers in said solution, while maintaining said solution in a state of continuous agitation while the solution contains sufficient redox catalyst for the polymerization of said compound, whereby substantial prepolymerization of said compound in said solution is precluded.

2. The method of claim 1 wherein an azo catalyst is substituted for the redox catalyst system.

3. An improved method of reacting keratin fibers with ethylenically unsaturated compounds comprising providing a continuously agitated aqueous solution containing at least one ethylenically unsaturated compound and sufficient redox catalyst system containing both components of the redox catalyst for the polymerization of said compound; immersing the keratin fibers in said solution, while maintaining said solution in a state of continuous agitation whereby substantial pre-polymerization of said compound in said solution is precluded; and heating said solution as it contacts said keratin fibers, whereby preferential reaction between the ethylenically unsaturated compound and keratin fibers is effected.

4. An improved method of reacting keratin fibers with ethylenically unsaturated compounds comprising providing a continuously agitated aqueous solution containing at least one ethylenically unsaturated compound and sufficient redox catalyst system containing both components of the redox catalyst for the polymerization of said compound; heating said continuously agitated solution; and immersing the keratin fibers in said heated, continuously agitated solution, whereby preferential reaction between the fibers and the ethylenically unsaturated compound is effected.

5. The method of claim 4 wherein the continuously agitated solution is heated to a potentially rapid polymerization state and the keratin fibers are immersed in said solution as this polymerization state is approached.

6. The method of claim 5 wherein the keratin fibers are immersed in said solution after the polymerization state is reached.

7. An improved method of reacting keratin fibers with ethylenically unsaturated compounds comprising providing a mass of keratin fibers, continuously forcing through said fibers a single medium containing at least one ethlenically unsaturated compound and both components of a redox catalyst system for the polymerization of said compound, said medium being maintained in a state of continuous agitation while the medium contains sufficient catalyst for the polymerization of said compound whereby substantial homopolymerization of said compound in said medium is precluded and preferential reaction between the keratin fibers and said compound is effected.

8. An improved method of reacting keratin fibers with ethylenically unsaturated compounds comprising providing a mass of keratin fibers, continuously forcing through said fibers a single aqueous solution containing at least one ethylenically unsaturated compound and both components of a redox catalyst system for the polymerization of said compound; and heating said solution to a state wherein the ethylenically unsaturated compound could potentially react with itself at a rapid rate; said solution being maintained in a state of continuous agitation while the solution contains sufficient catalyst for the polymerization of said compound whereby substantial homopolymerization of said compound is precluded and preferential reaction between the keratin fibers and the ethylenically unsaturated compound is effected.

9. The method of claim 8 wherein the redox catalyst system comprises an iron compound and a peroxide.

10. The method of claim 8 wherein an azo catalyst is substituted for the redox catalyst system.

References Cited

UNITED STATES PATENTS

| | | | |
|---|---|---|---|
| 2,406,412 | 8/1946 | Speakman et al. | 117—141 |
| 2,940,869 | 6/1960 | Graham. | |
| 2,956,899 | 10/1960 | Cline. | |
| 3,005,730 | 10/1961 | Pardo | 117—141 |
| 3,008,920 | 11/1961 | Urchick. | |
| 3,083,118 | 3/1963 | Bridgeford | 8—128 |
| 3,291,560 | 12/1966 | Machell et al. | 8—127.6 |

NORMAN G. TORCHIN, Primary Examiner

J. CANNON, Assistant Examiner

U.S. Cl. X.R.

8—128; 117—141